United States Patent
Gelfenbeyn et al.

(10) Patent No.: US 9,564,149 B2
(45) Date of Patent: Feb. 7, 2017

(54) METHOD FOR USER COMMUNICATION WITH INFORMATION DIALOGUE SYSTEM

(71) Applicant: OOO "Speaktoit", Moscow (RU)

(72) Inventors: Ilya Genadevich Gelfenbeyn, Linevo (RU); Artem Goncharuk, Arlington, VA (US); Ilya Andreevich Platonov, Berdsk (RU); Olga Aleksandrovna Gelfenbeyn, Yurga (RU); Pavel Aleksandrovich Sirotin, Moscow (RU)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/721,012

(22) Filed: May 26, 2015

(65) Prior Publication Data

US 2015/0255089 A1  Sep. 10, 2015

Related U.S. Application Data

(63) Continuation-in-part of application No. PCT/IB2012/056955, filed on Dec. 4, 2012.

(30) Foreign Application Priority Data

Nov. 28, 2012  (RU) .................... 2012150996

(51) Int. Cl.
G10L 15/22 (2006.01)
G10L 25/63 (2013.01)
G06F 17/30 (2006.01)
G06F 3/16 (2006.01)
(Continued)

(52) U.S. Cl.
CPC ............... G10L 25/63 (2013.01); G06F 3/167 (2013.01); G06F 17/30654 (2013.01);
(Continued)

(58) Field of Classification Search
CPC ......... G10L 15/22; G10L 15/26; G10L 15/30; H04M 2201/40; H04M 2201/60
(Continued)

(56) References Cited

U.S. PATENT DOCUMENTS 8,055,713 B2   11/2011  Simske et al.
2002/0082839 A1*  6/2002  Hinde .................... G10L 15/30
                                                            704/270.1
(Continued)

FOREIGN PATENT DOCUMENTS

RU        2352979 C2    4/2009

OTHER PUBLICATIONS

A. V. Frolov et al. Sintez i raspoznavanie rechi. Sovremennye resheniya, Oct. 14, 2012 [on-line] [retrieved on Jul. 8, 2013]. Foundfrom Internet: <URL: http://web.archive.org/web/20121014093936/www.frolov-lib.ru/books/hi/ch06.html>p. 3, section "Programma VoiceNavigator", p. 29, section "Protsess raspoznavaniya teksta".

(Continued)

Primary Examiner — Pierre-Louis Desir
Assistant Examiner — Yi-Sheng Wang
(74) Attorney, Agent, or Firm — Georgiy L. Khayet

(57) ABSTRACT

Provided is a method for user communications with an information dialog system, which may be used for organizing user interactions with the information dialog system based on a natural language. The method may include activating a user input subsystem in response to a user entering a request; receiving and converting the request of the user into text by the user input subsystem; sending the text obtained as a result of the conversion of the request to a dialog module; processing, by the dialog module, the text; forming, by the dialog module, the response to the request; sending the response to the user; and displaying and/or reproducing the formed response, where, after the displaying and/or the reproducing of the formed response, the user input subsystem is automatically activated upon entering a further request or a clarification request by the user.

17 Claims, 2 Drawing Sheets

(51) Int. Cl.
*G10L 15/26* (2006.01)
*G10L 21/18* (2013.01)
*G10L 15/18* (2013.01)

(52) U.S. Cl.
CPC .......... *G10L 15/1807* (2013.01); *G10L 15/22* (2013.01); *G10L 15/265* (2013.01); *G10L 21/18* (2013.01); *G10L 15/18* (2013.01); *G10L 2015/223* (2013.01); *G10L 2015/227* (2013.01)

(58) Field of Classification Search
USPC ................ 703/270.1, 235, E15.04, E15.047
See application file for complete search history.

(56) References Cited

U.S. PATENT DOCUMENTS

| | | | |
|---|---|---|---|
| 2005/0267759 A1* | 12/2005 | Jeschke | G10L 15/22 704/270 |
| 2007/0083375 A1 | 4/2007 | Lee et al. | |
| 2009/0012787 A1* | 1/2009 | Itoh | G10L 15/26 704/235 |
| 2009/0171659 A1* | 7/2009 | Pearce | G10L 15/24 704/235 |
| 2011/0166852 A1 | 7/2011 | Kim et al. | |
| 2012/0121077 A1* | 5/2012 | Gabay | H04L 65/1063 379/211.02 |
| 2013/0253926 A1* | 9/2013 | Takahashi | G10L 13/00 704/235 |

OTHER PUBLICATIONS

Isotani Ryosuke et al. Speech-to-Speech Translation Software on PDAs for Travel Conversation. NEC Res. & Develop., vol. 44, No. 2, Apr. 2003, p. 201, section "Discussion".

* cited by examiner

METHOD FOR USER COMMUNICATION WITH INFORMATION DIALOGUE SYSTEM

CROSS-REFERENCE TO RELATED APPLICATION

This application is a continuation-in-part of International Application No. PCT/IB2012/056955, entitled "METHOD FOR USER COMMUNICATION WITH INFORMATION DIALOGUE SYSTEM," filed on Dec. 4, 2012, which is incorporated herein by reference in its entirety.

TECHNICAL FIELD

This application relates to information technologies and, in particular, to a method for user communication with an information dialogue system, and may be used for organizing user interactions with the information dialogue system based on a natural language.

BACKGROUND

Information dialogue systems have gained widespread use in various fields of life (for example, for organizing automatic knowledge tests, automated customer support service, disease diagnostics, and so forth). However, existing information dialogue systems target solving narrowly defined tasks. Therefore, the existing information dialogue systems can only support a dialogue related to a certain topic. In addition, most of the existing information dialogue systems are unable to form a response in a natural language, impart emotional overtone to a generated response, or perform any additional operations, including interacting with other information systems and subsystems. Existence of such possibilities can allow for not only performing a two-way exchange of information, instructions, and commands between a user and the system, but also conducting a meaningful dialogue, thereby creating an impression, for the user, of communicating with a live interlocutor. Thus, much more effective solutions to the problems set by the user may be provided. This is why methods for user communications with the information dialogue system that can expand the possibilities of the user interaction with the information dialogue system remain important.

Conventional adaptive natural language interfaces and methods for receiving, interpreting, and executing of user input in a natural language are described, for example, in U.S. Pat. No. 7,216,080, published on Mar. 8, 2007. The method described in the above-mentioned patent includes entering a request by a user, receiving and converting the request into text, processing the text and forming a response in a form of an output command, converting the output command to an execution command, and outputting the execution command to an additional system and/or subsystems for execution. However, the disadvantages of the described solution include the possibility for the user to enter the request only in the natural language. Thus, the user cannot enter text using peripheral devices, such as a keyboard, for example. In addition, a voice cue formed in response to the request of the user cannot connote an emotional overtone and, therefore, cannot indicate an emotional state of the information dialogue system.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Provided are an information dialogue system and a method of user communication with the information dialogue system. The method of user communication with the information dialogue system may include activation of a user input subsystem by a user, entering a request by the user, receiving and converting the request of the user into the text by a user input subsystem, sending the text obtained as a result of the conversion of the request to a dialogue module, processing the received text by the dialogue module, forming the response to the request by the dialogue module, sending the response to the user, and displaying and/or reproducing the generated response. After the displaying and/or reproducing the formed response, a user input subsystem may be automatically activated, followed by entering a further request or a clarification request by the user.

According to an example embodiment, the information dialogue system may include a user input subsystem, a voice generation and reproduction subsystem, a display and a keyboard of a user device, additional buttons, a dialogue module, additional systems and/or subsystems, a user profile, and a client memory. The user input subsystem may include at least two components, by means of which the user input may be received and converted. These components may include a voice record and recognition component, a keyboard, and like devices, components, and means accompanied by appropriate software, if necessary.

In further exemplary embodiments, modules, subsystems, or devices can be adapted to perform the recited steps. Other features and exemplary embodiments are described below.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure relates to methods for user communications with an information dialogue system and to information dialogue systems. A method for user communications with an information dialogue system may provide the possibility of simplifying user interaction with the information dialogue system, reduction in the number of operations required to perform the communications, and the possibility of interactions with the information dialogue system not only by entering text, but also by using a natural language.

More specifically, the information dialogue system in the context of the present disclosure includes a system equipped with a user input subsystem, a voice generation and reproduction subsystem, a display, a dialogue module, additional systems and/or subsystems, additional buttons, a user profile, and a client memory. The user input subsystem may include at least two components, by means of which the user input may be received and converted. These components may include a voice record and recognition component, a keyboard, and like devices, components, and means, which may be accompanied by appropriate software, if necessary.

The method of user communication with the information dialogue system may include activation of a user input subsystem by a user, followed by entering a request by the user. The user input subsystem may receive and convert the request into text and send the text obtained as a result of the conversion to a dialogue module. The dialogue module may process the text received from the user input subsystem and form a response to the request. The dialogue module may further send the response to the user. The response may be displayed and/or reproduced to the user. After displaying and/or reproducing the response, a user input subsystem may be automatically activated. After the activation of the user input subsystem, the user may enter a further request, such as a new request or a clarification request.

Figure 1:
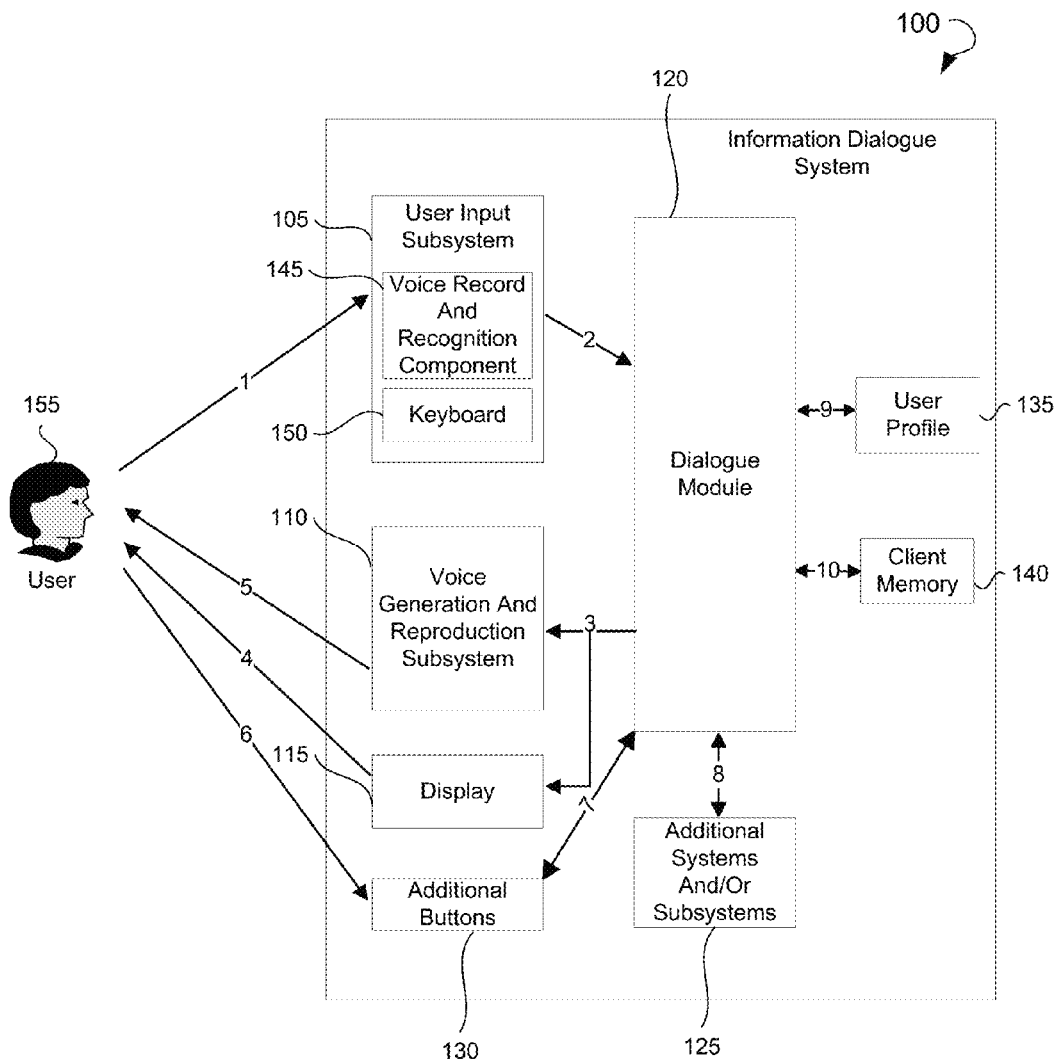
FIG. 1 shows a detailed block diagram of a system for communication with an information dialogue system, in accordance with certain embodiments.

Referring now to the drawings, FIG. 1 shows an information dialogue system 100. The information dialogue system 100 may include a user input subsystem 105, a voice generation and reproduction subsystem 110, a display 115, a dialogue module 120, additional systems and/or subsystems 125, additional buttons 130, a user profile 135, and a client memory 140. The user input subsystem 105 may include a voice record and recognition component 145 and a keyboard 150.

In an example embodiment, the keyboard 150 and the display 115 may be associated with a user device (not shown). The user device may include a mobile device, such as a laptop, a notebook, a tablet, a mobile phone, a smart phone, and similar devices, as well as stationary electronic devices, such as computers and similar devices.

The additional buttons 130 may include physical buttons of the user device and soft keys of the information dialogue system 100. For example, pressing the "Microphone" soft key by the user may activate or disable the voice record and recognition component 145, pressing the "Cancel" soft key may cancel the current operation performed by the information dialogue system 100, and so forth. The information dialogue system 100 may include additional functional keys. The additional systems and/or subsystems 125 in the context of the present disclosure may include systems for working with functions of user devices, such as a global positioning system.

The user profile 135 may include an account that includes settings, preferences, instructions, and user information. The client memory 140 may store information about a user 155 that interacts with the information dialogue system 100.

FIG. 1 shows further interactions between the components of the information dialogue system 100, represented by arrows 1-10, namely:

1—activation of a user input subsystem 105 by a user 155, entering a request by the user 155, and receiving and converting the request of the user 155 into the text by the user input subsystem 105;

2—sending the text received as a result of conversion to a dialogue module 120, followed by processing the received text by the dialogue module 120 and forming a response to the request by the dialogue module 120;

3—sending the response to the user 155;

4—displaying the formed response in the form of the text on a display 115;

5—reproduction of the formed response in the form of a voice cue by a voice generation and reproduction subsystem 110, followed by an automatic activation of the user input subsystem 105;

6—pressing additional buttons 130 by the user 155 (for example, disabling of the voice record and recognition component 145);

7—performing the actions corresponding to the additional buttons 130;

8—interaction with the additional systems and/or subsystems 125 (sending of the request to the additional system and/or a subsystem 125 by the dialogue module 120, processing the received request by the additional system and/or the subsystems 125, sending a result to the dialogue module 120);

9—interaction with the user profile 135 (sending the request by the dialogue module 120, receiving information from the user profile 135);

10—interaction with a client memory 140.

The interactions marked by arrows 6, 7, 8, 9, and 10 may be optional.

Figure 2:
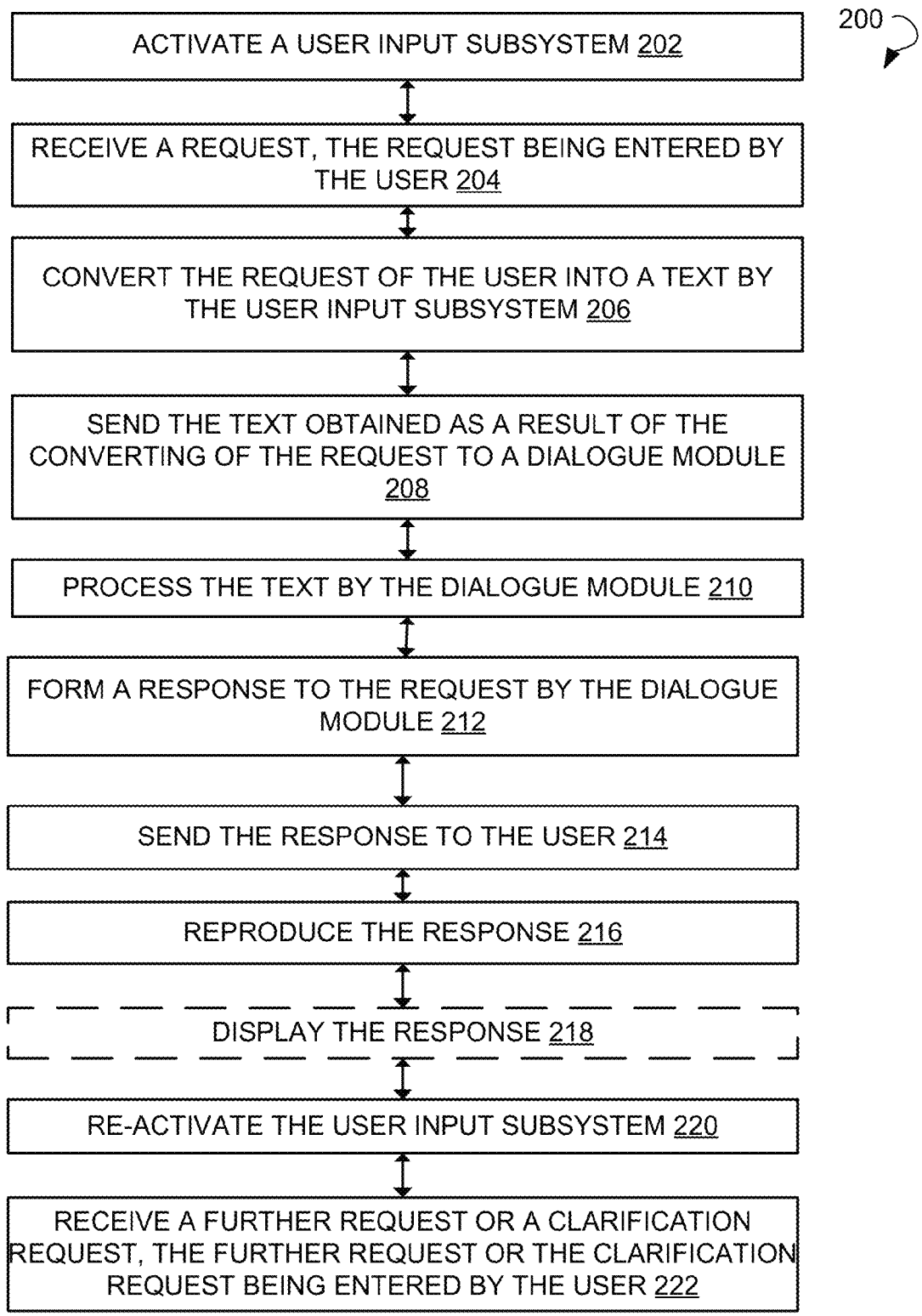
FIG. 2 illustrates a flowchart of a method for user communications with an information dialogue system, in accordance with certain embodiments.

FIG. 2 shows a flowchart of a method 200 for user communications with an information dialogue system including necessary and optional operations of the method 200 for user communications with the information dialogue system. The method 200 may start with activating a user input subsystem at operation 202. In an example embodiment, the user input subsystem is activated by a user using a user device. More specifically, the user may enter a request using the user device. In an example embodiment, the request of the user is entered by the user using a voice command generated by the user. The user may generate the voice command in a natural language. Furthermore, the request of the user may be entered as text. More specifically, the text can be input by the user using the keyboard. Thus, the user may have the ability to enter the request during the dialogue with the information dialogue system both by the voice command and by entering the text via the keyboard.

The method 200 may continue with receiving the request of the user at operation 204. Upon receiving the request, the request may be converted into text at operation 206. The conversion may be performed by the user input subsystem. The method 200 may continue with sending the text obtained as a result of the converting to a dialogue module at operation 208.

Upon receiving the text from the user input subsystem, the dialogue module may process the received text at operation 210. The dialogue module may process the text using additional systems and/or subsystems. Depending on the content of the request entered by the user, there may be a need to use functions of the additional systems and/or subsystems for forming a credible response. The additional systems and/or subsystems may include a global positioning system and so forth. Thereby, forming of an accurate and comprehensive response to the request of the user may be provided.

Upon processing the text, the dialogue module may form a response to the request at operation 212. In an example embodiment, the dialogue module forms the response in a form of the text. Implementation of the method 200, in which the response is formed by the dialogue module in the form of the text, is preferable.

In a further example embodiment, the response formed by the dialogue module may include additional metadata. The additional metadata may include instructions to be forwarded to additional systems and subsystems. The additional metadata may be in addition to the response formed by the dialogue module. The additional metadata may contain information concerning an emotional overtone of the response formed by the information dialogue system and displayed on the display and/or reproduced by the voice generation and reproduction subsystem. The additional metadata may further contain the instructions sent to the additional systems and/or subsystems. Thus, presence of emotions in the response may create an impression for the user of communication with a live interlocutor, thereby enhancing the experience of interaction with the information dialogue system. Furthermore, the additional metadata may further contain extensions of responses associated with a specific embodiment of the information dialogue system.

In an example embodiment, the response formed by the dialogue module may be also considered as a clarification request sent to the user who interacts with the information dialogue system, or as an action of the information dialogue system accompanied by the text displayed on the display and/or the voice cue. For example, the user may enter a request containing a command to send an SMS. A response of the system may be to send the SMS and a text and/or a voice confirmation of performing the request.

The dialogue module may send the formed response to the user at operation 214. The response may be reproduced at operation 216. In an example embodiment, the response may be reproduced by a voice generation and reproduction subsystem. Furthermore, the response may be reproduced using a voice cue.

Optionally, the response may be shown at operation 218. More specifically, the response may be displayed by showing the text on a display. Thus, after sending the response to the user, the text of the response may be shown on the display and/or reproduced by the voice generation and reproduction subsystem in the form of the voice cue.

Upon the reproducing or displaying of the response, the user input subsystem may be re-activated at operation 220. In an example embodiment, the user input subsystem may be re-activated after a time period. The time period can be preliminarily set by the dialogue module after the displaying or the reproducing of the response.

More specifically, in case the response formed by the information dialogue system includes additional results requiring extra reading and reviewing time, it may be necessary to activate the user input subsystem and, in particular, the voice record and recognition component, after a time period. The voice record and recognition component may be deactivated both independently by the user and according to instructions contained in the response of the dialogue module to the request. According to the instructions, the voice record and recognition component may be activated after the time period preliminarily set by the dialogue module or may not be activated at all. Also, the dialogue module may preset a value for how long the voice record and recognition component has to wait to enter the request made by the user.

Upon activation of the user input subsystem, a further request or a clarification request may be received at operation 222. The further request or the clarification request may be entered by the user. Therefore, the method 200 may be performed cyclically, and the cycle of implementation of the method may be finished upon user request. Thereafter, the dialogue of the user with the information dialogue system may be performed, and the user may enter the further request or the clarification request every time after obtaining the response.

While implementing the method 200 for user communication with the information dialogue system, the user may be provided with the ability to disable the voice record and recognition component. Thus, the user may interact with the information dialogue system by entering the request via the keyboard.

Example embodiments of the method for user communication with the information dialogue system are described below.

A) An Automatic Start of the Record and Recognition Component After Displaying and/or Reproducing the Formed Response A user may activate the user input subsystem and enter a request (operation 1). The request of the user may be received and converted into the text by the user input subsystem, and the text obtained as a result of the conversion may be sent to a dialogue module (operation 2). Then the received text may be processed by the dialogue module and a response to the request may be formed by the dialogue module. Then the response may be sent to the user (operation 3), followed by displaying of the formed response in the form of the text on the display (operation 4) and/or reproducing of the formed response in the form of a voice cue by a voice generation and reproduction subsystem (operation 5). Thereafter, the user input subsystem may be automatically activated, and the user may have the opportunity to disable a voice record and recognition component. If the user enters a further request via a keyboard, the record and recognition component can be automatically deactivated.

B) Disabling the Voice Record and Recognition Component

B1) As mentioned earlier, the response formed by the dialogue module may contain additional metadata, for reviewing of which extra time may be necessary. Therefore, it may be necessary to not activate the user input subsystem and, in particular, the voice record and recognition component.

More specifically, the user may activate the user input subsystem and enter the request (operation 1). Then the request may be received and converted into the text by the user input subsystem, and the text obtained as a result of the conversion may be sent to the dialogue module (operation 2). Thereafter, the received text may be processed by the dialogue module and the response to the request may be formed by the dialogue module. Thereafter, the response may be sent to the user (operation 3), followed by displaying the formed response in the form of text on the display (operation 4) and/or reproducing the formed response in the form of a voice cue by the voice generation and reproduction subsystem (operation 5). Then the user input subsystem may be automatically activated, while the voice record and recognition component may be not automatically activated.

B2) As mentioned earlier, the response of the information dialogue system may include additional metadata, which may include instructions forwarded to additional systems and/or subsystems. In such a case, it may not be necessary to activate the voice record and recognition component.

More specifically, the user may activate the user input subsystem and enter the request (operation 1). The request of the user may be received and converted into text by the user input subsystem and the text obtained as a result of the conversion may be sent to the dialogue module (operation 2). Then the received text may be processed by the dialogue module and the response to the request may be formed by the dialogue module. The response may be sent to the user (operation 3), followed by displaying of the formed response in a form of the text on the display (operation 4) and/or reproducing the formed response in the form of the voice cue by the voice generation and reproduction subsystem (operation 5), while the voice record and recognition component may not be automatically activated.

C) An Automatic Activation of the Voice Record and Recognition Component After a Predetermined Time Period As mentioned earlier, the response formed by the dialogue module may contain additional metadata, for reviewing of which extra time may be necessary. Therefore, it may be necessary to not activate the user input subsystem and, in particular, the voice record and recognition component.

More specifically, the user may activate the user input subsystem and enter the request (operation 1). The request of the user may be received and converted into the text by the user input subsystem, and text obtained as a result of the conversion may be sent to the dialogue module (operation 2). Then the received text may be processed by the dialogue module and the response to the request may be formed by the dialogue module. The response may be sent to the user (operation 3), followed by displaying the formed response in the form of the text on the display (operation 4) and/or reproducing the formed response in the form of the voice cue by the voice generation and reproduction subsystem (operation 5). Thereafter, the user input subsystem may be automatically activated, and the voice record and recognition component may be automatically activated after the time period predetermined by the dialogue module.

D) Disabling the Voice Generation and Reproduction Subsystem

As mentioned earlier, the response formed by the dialogue module may be displayed and/or reproduced. If it is sufficient for the user that the response is displayed in the form of text on the display, the response may be not reproduced, and, therefore, the voice generation and reproduction subsystem may be not activated.

More specifically, the user may activate the user input subsystem and enter the request (operation 1). The request of the user may be received and converted into text by the user input subsystem, and the text obtained as a result of the conversion may be sent to the dialogue module (operation 2). The received text may be processed by the dialogue module and the response to the request may be formed by the dialogue module. The response may be sent to the user (operation 3), followed by a display of the formed response in the form of the text on the display (operation 4), and the voice record and recognition component may not be activated.

Thus, the method for user communication with the information dialogue system may provide simplification of the user interaction with the information dialogue system, reduce the number of actions necessary for communication, and also provide the possibility of interaction with the information dialogue system not only by entering the text, but also by using a natural language.

Thus, a system for user communication with the information dialogue system and a method for user communication with the information dialogue system have been described herein. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A method for user communications with an information dialogue system, the method comprising:
   activating, by a user device, a user input subsystem associated with the user device upon a request entered by a user;
   receiving, by the user input subsystem, the request;
   converting, by the user input subsystem, the request into text;
   sending, by the user input subsystem, the text obtained as a result of the converting of the request to a dialogue module associated with the user device;
   upon sending the text, deactivating the user input subsystem;
   processing the text by the dialogue module;
   forming, by the dialogue module, a response to the request, the response including an instruction for activating the user input subsystem, the instruction including at least metadata and a time period required for the user to review the response;
   sending, by the dialogue module, the response to the user;
   reproducing the response by a voice generation and reproduction subsystem associated with the user device;
   upon the reproducing of the response, determining, based on the metadata contained in the instruction, expiration of the time period required for the user to review the response;
   based on the determining, re-activating, by the user device, the user input subsystem; and
   receiving a further request or a clarification request, the further request or the clarification request being entered by the user.

2. The method of claim 1, further comprising displaying the response, the response including the text.

3. The method of claim 1, wherein the request is entered by the user using one or more of the following: a voice command and a keyboard.

4. The method of claim 1, wherein the response is formed by the dialogue module in a form of the text.

5. The method of claim 1, wherein the reproducing the response includes reproducing the response by a voice generation and reproduction subsystem.

6. The method of claim 1, wherein the reproducing the response includes reproducing the response using a voice cue.

7. The method of claim 1, wherein the text is processed by the dialogue module using additional systems and subsystems.

8. The method of claim 1, wherein the response formed by the dialogue module includes additional metadata.

9. The method of claim 8, wherein the additional metadata includes instructions for sending to additional systems and subsystems.

10. A system for user communications with an information dialogue system, the system comprising:
    a user input subsystem, wherein the user input subsystem is activated by a user and is operable to:
    receive a request entered by the user;

convert the request into text;
send the text obtained as a result of the converting the request to a dialogue module; and
receive a further request or a clarification request, the further request or the clarification request being entered by the user,
wherein the user input subsystem is deactivated upon sending the text;
the dialogue module in communication with the user input subsystem, the dialogue module being operable to:
process the text;
form a response to the request, the response including an instruction for activating the user input subsystem, the instruction including at least metadata and a time period required for the user to review the response; and
send the response to the user; and
a voice generation and reproduction subsystem in communication with the dialogue module, the voice generation and reproduction subsystem being operable to:
reproduce the response;
upon the reproducing of the response, determining, based on the metadata contained in the instruction, expiration of the time period required for the user to review the response; and
based on the determining, re-activate the user input subsystem.

11. The system of claim 10, further comprising a display, the display being operable to display the response, wherein the display of the response includes displaying the text.

12. The system of claim 10, wherein the user input subsystem comprises a voice record and recognition component and a keyboard, wherein the request is entered by the user using one or more of the following: a voice command and the keyboard.

13. The system of claim 10, wherein the dialogue module forms the response in a form of the text.

14. The system of claim 10, wherein the voice generation and reproduction subsystem is operable to reproduce the response using a voice cue.

15. The system of claim 10, further comprising additional systems and subsystems, wherein the dialogue module processes the text using the additional systems and subsystems.

16. The system of claim 10, wherein the response formed by the dialogue module includes additional metadata.

17. The system of claim 16, wherein the additional metadata include instructions for sending to additional systems and subsystems.

* * * * *